United States Patent [19]

Storm et al.

[11] Patent Number: 5,889,768
[45] Date of Patent: Mar. 30, 1999

[54] METHOD OF AND APPARATUS FOR PILOT CHANNEL ACQUISITION

[75] Inventors: Brian D. Storm, Round Lake Beach; David J. Krause, Hainesville, both of Ill.

[73] Assignee: Motorola, Inc., Schaumburg, Ill.

[21] Appl. No.: 706,150

[22] Filed: Aug. 30, 1996

[51] Int. Cl.$^6$ ................................................. H04B 7/216
[52] U.S. Cl. .......................... 370/320; 370/209; 370/331; 370/332; 375/200; 375/206; 455/436; 455/438
[58] Field of Search .................................. 370/209, 331, 370/332, 335, 347, 320; 375/200, 206, 362, 364; 455/436, 437, 438, 442

[56] References Cited

U.S. PATENT DOCUMENTS

| | | | |
|---|---|---|---|
| 5,101,501 | 3/1992 | Gilhousen et al. | 455/33 |
| 5,109,390 | 4/1992 | Gilhousen et al. | 375/1 |
| 5,267,261 | 11/1993 | Blakeney et al. | 370/332 |
| 5,392,287 | 2/1995 | Tiedemann, Jr. et al. | 375/95.1 |
| 5,490,165 | 2/1996 | Blakeney, II et al. | 375/205 |
| 5,509,015 | 4/1996 | Tiedemann, Jr. et al. | 370/95.3 |
| 5,644,591 | 7/1997 | Sutton | 375/206 |
| 5,691,974 | 11/1997 | Zehavi et al. | 370/320 |

*Primary Examiner*—Chi H. Pham
*Assistant Examiner*—Frank Duong
*Attorney, Agent, or Firm*—Lalita P. Williams; Donald C. Kordich

[57] ABSTRACT

A wireless communication device 100 acquires a pilot channel before an assigned slot when the wireless communication device is operating in the slotted mode of a CDMA system. The wireless communication device comprises a searcher receiver 107 that determines the short-term average pilot strength of active and neighbor pilot channels. Finger receivers 107 determine the long-term average pilot strength of the active and neighbor pilot channels. A logic and control circuit 113 assigns the finger receivers to the pilot channels according to their short-term average pilot strength, determines if the long-term average pilot strength of a neighbor channel is greater than the active pilot channel's pilot strength, and determines to hand off to the neighbor pilot channel with the greater long-term average pilot strength. Moreover, an early detection correlation length can be dynamically adjusted according to the pilot strength of the active pilot channel to shorten the pilot acquisition process.

21 Claims, 5 Drawing Sheets

METHOD OF AND APPARATUS FOR PILOT CHANNEL ACQUISITION

FIELD OF THE INVENTION

The present invention relates generally to the field of digital communication, and more particularly to a method of and apparatus for pilot channel acquisition. Although the invention is subject to a wide range of applications, it is especially suited for use in wireless communication devices that utilize Code-Division Multiple Access (CDMA) having a slotted mode feature, and will be particularly described in that connection.

BACKGROUND OF THE INVENTION

In cellular telephones systems, the communication from the base station to the mobile station, such as a handheld radiotelephone, is carried out over a forward channel; and, conversely, the communication from the mobile station to the base station is carried out over a reverse channel. Under the Interim Standard IS-95-A, which has been adopted by the Telecommunications Industry Association for implementing CDMA, pages are sent from the base station to a mobile station over a forward channel referred to as a paging channel. The page informs the mobile station that a call has been placed to it.

IS-95-A provides for a slotted mode feature, which allows a mobile station to operate in a reduced power mode. That is, the paging channel is divided into 80 millisecond (ms) intervals called paging channel slots, and each mobile station operating in the slotted mode is assigned a specific slot in which they monitor the paging channel. The assigned slot is periodic-called a slot cycle. Because the mobile station only needs to monitor the paging channel during its assigned slot, at all other times of the slot cycle the mobile station can "sleep," that is, go into the reduced power mode by, for example, turning off its radio frequency (RF) portion. To monitor the next periodic slot, the mobile station must "wake up" from its sleep in time to monitor the paging channel at the assigned slot.

The cellular system comprises a number of base stations scattered over a geographic area, and the mobile station can move throughout the area. Before the mobile station can monitor the paging channel after waking, it must first determine from which base station it will monitor the paging channel, preferably the base station that provides the strongest channel signal. In the CDMA system according to IS-95-A, each base station continuously transmits a pilot channel signal. The pilot signal transmitted by each base station has the same spreading code but with a different code phase offset. Phase offset allows the pilot signals to be distinguished from one another, which in turn allows the base stations to be distinguished. IS-95 defines the spreading code as a PN sequence having a period $2^{15}$ chips, and phase offset as a multiple of 64 chips relative a zero offset pilot PN sequence.

In a static environment, the mobile station stays within the coverage of the base station it was monitoring before going to sleep (called an "active pilot"), and, when it wakes up, will most likely acquire the same pilot signal it monitored before going to sleep. In a dynamic environment, the mobile station may not be in the coverage of the base station it was monitoring before sleeping, and a handoff to another base station may be necessary before the paging channel can be monitored. The pilot channel acquisition—whether of the active pilot or of another base station—must occur before the assigned slot is to be monitored so that the mobile station does not miss any pages and, consequently, not miss any calls.

A need therefore exists for a method of and apparatus for acquiring a pilot channel prior to the arrival of the assigned slot when the mobile station is operating in the slotted mode of a CDMA system.

DESCRIPTION OF THE PREFERRED EMBODIMENTS

The method and apparatus described herein acquires a pilot channel prior to the arrival of the assigned slot when the mobile station is operating in the slotted mode of a CDMA system. Furthermore, pilot channel acquisition is performed in an efficient manner by dynamically adjusting an early detection threshold. The adjusted early detection threshold can shorten or lengthen the time to sweep a pilot channel. Moreover, pilot channel acquisition is performed in a reliable manner by utilizing finger receivers to track the strongest neighbor pilots and to provide reliable pilot signal strength measurements of the neighbor pilots and the active pilot.

Additional advantages and novel features of the invention will be set forth in part in the description which follows, wherein embodiments of the invention are shown and described, and in part become apparent to those skilled in the art upon examination of the following detailed description or may be learned by practice of the invention.

Reference will now be made in detail to an embodiment configured according to the present invention.

Figure 1:
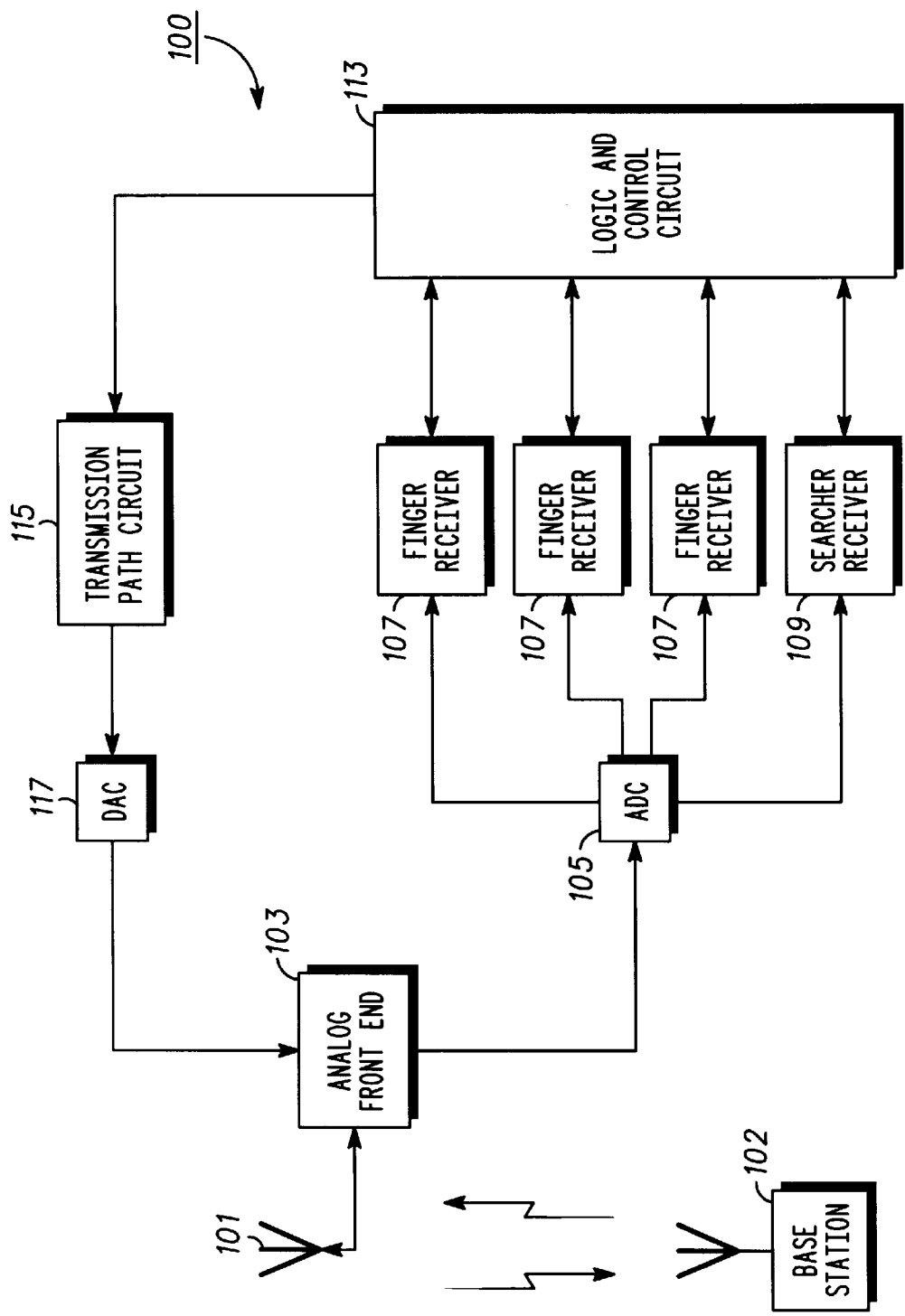
FIG. 1 is an electrical block diagram of a wireless communication device employing the method.

FIG. 1 is a an electrical block diagram of a wireless communication device, e.g., a radiotelephone 100, that can employ the method according to the invention. This figure illustrates, among other things, an antenna 101 for receiving signals from base stations 102 (only one shown) and transmitting signals originated by radiotelephone 100. An analog front end 103 processes the received signals and provides them to an analog-to-digital converter (ADC) 105. The digitized received signals are provided to a rake receiver comprised of a plurality of finger receivers 107 and at least one searcher receiver 109 connected in parallel. The operation of the finger receivers and search receiver is controlled in part by a logic and control circuit 113. The output of the finger receivers and search receiver is provided to the logic and control circuit 113 for further processing. Logic and control circuit 113 also provides data to transmission circuit path 115, which processes the data and provides the processed data to a digital to analog circuit (DAC) 117. The analog signal output by DAC 117 is provided to analog front end 103 for transmission to base stations 102 via antenna 101. An example of the rake receiver and transmission circuit path 115 is the Mobile Station Modem available from Qualcomm, Inc.

Although logic and control circuit 113 is shown as a separate element from the receivers, one of ordinary skill will recognize that portions of the logic and control circuit may reside in the receivers.

When radiotelephone 100 is awake, antenna 101 receives from the active pilot a neighbor set, which is a list of pilot channels of base stations that are probable candidates for handoff. A record of the active pilot and the neighbor pilots are stored in logic and control circuit 113 before radiotelephone 100 goes to sleep.

Searcher receiver 109 is capable of sweeping the pilot channel signal of the active pilot and neighbor pilots to determine the pilot channel strength of each. Searcher receiver 109 determines pilot channel strength by a complex correlation process which provides a measure of $E_c/I_o$ in decibels (dB), where $E_c$ is a measure of the pilot energy and $I_o$ is the total power spectral density in the received bandwidth. This power measurement will be referred to as short-term average $E_c/I_o$ and represents a signal-to-signal plus noise ratio.

A pilot signal emanating from a base station may travel along several paths called "rays," thus producing multi-path signals. In performing a sweep of the pilot signal of the neighbor pilots, searcher receiver 109 sets a multiple chip window centered on the code phase offset of the particular pilot signal. The purpose of the sweep of the chip window is to develop a multi-path profile of the pilot signal. A complex correlation and measure of short-term average $E_c/I_o$ is obtained for each of the multiple chip offsets of the chip window in searching for the strongest ray of the neighbor pilot that appears in the chip window.

The complex correlation has two stages. In an early detection stage, short-term average $E_c/I_o$ is determined for a subset of the maximum number of chips (the "chips" referenced here are of the pilot signal) normally correlated to provide an indication of whether sufficient pilot signal energy exists at the particular chip offset. The subset of the maximum number of chips is referred to as an early detection correlation length. When the short-term average $E_c/I_o$ is great enough at the early detection correlation length, the second stage is performed, which is to complete the correlation for the maximum number of chips.

The method of use and operation of the wireless communication device as constructed and described above will now be described with reference to FIGS. 2–5, which are flow charts illustrating a method of sweeping a pilot channel, a method of pilot channel acquisition carried out by the wireless communication device, and a method of assigning a finger receiver to a pilot channel, respectively.

Figure 2:
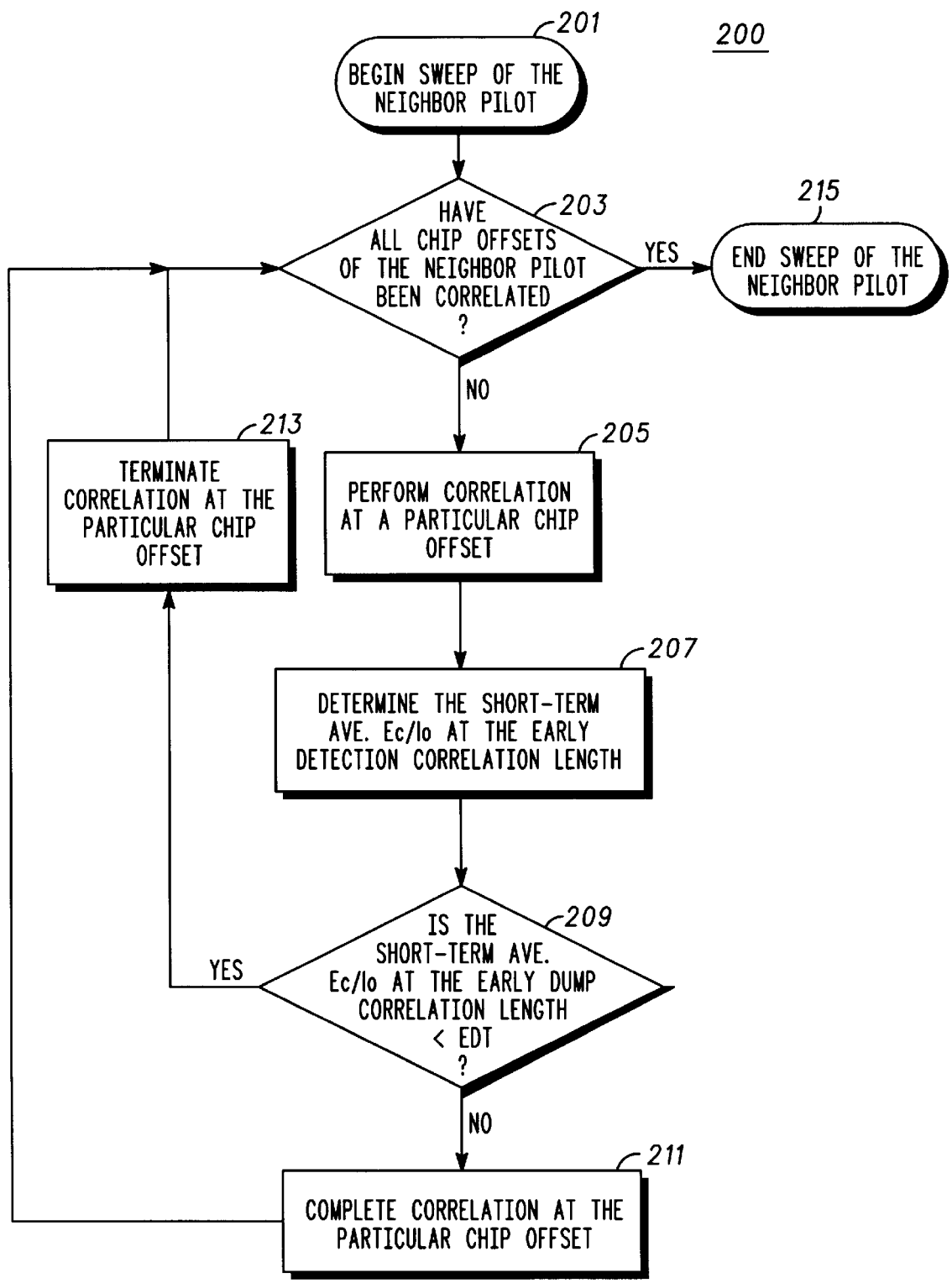
FIGS. 2 and 3 are flow charts illustrating a method of pilot channel acquisition carried out by the wireless communication device.

Reference will now be made to FIG. 2, which illustrates a method 200 of sweeping a pilot channel. Initially, logic and control circuit 113 determines whether there are any neighbor pilots in the neighbor set. (See step 317 of FIG. 3 .) If so, searcher receiver 109 begins a sweep of the neighbor pilots. (Step 201.) In order to end the method for a sweep of a particular neighbor pilot, logic and control circuit 113 determines whether all chip offsets of the particular neighbor pilot have been correlated. (Step 203.) If so, the sweep of the neighbor pilot is completed. (Step 215.) If not, searcher receiver 109 performs the correlation at a particular chip offset. (Step 205.) As part of the correlation, searcher receiver 109 determines the short-term average $E_c/I_o$ of the particular chip offset at the early detection correlation length. (Step 207.)

Logic and control circuit 113 determines whether the pilot signal strength at the early detection correlation length is less than an early detection threshold (EDT). (Step 209.) When, after the correlation of the subset of maximum chips, the short-term average $E_c/I_o$ is less than the EDT, it is likely that the pilot signal is not present at that particular chip offset, thus the correlation at the particular chip offset is terminated, (step 213), and logic and control circuit 113 again determines whether all chip offsets of the particular neighbor pilot have been correlated.

When, after the correlation of the subset of maximum chips, the short-term average $E_c/I_o$ is not less than the EDT, indicating that there is sufficient energy in the pilot signal at the particular phase offset, the correlation is continued through the maximum number of chips, (step 211), and control of the method is returned to step 203. Eventually, all of the chip offsets for a particular neighbor will be correlated (either partially of fully). The short-term average $E_c/I_o$ for the strongest ray will be provided and used in determining whether a finger should be assigned to the strongest ray of the swept neighbor pilot signal.

Furthermore, the chip offset representing the strongest ray is used by the assigned finger receiver to track the neighbor pilot. A purpose of tracking the neighbor pilot is to ascertain the presence or absence the neighbor pilot over time as the searcher pilot continues to sweep the neighbor pilots of the neighbor set. Another purpose is to provide the pilot strength of the tracked neighbor pilot.

Depending on the number of finger receivers provided in radiotelephone 100, multiple fingers can be assigned to multiple rays of the same neighbor pilot to obtain a pilot signal strength representative of the combined rays.

Method 200 is performed for all of the neighbor pilots of the neighbor set, provided radiotelephone 100 wakes up early enough to complete the sweep of each neighbor before the paging channel is to be monitored at the assigned slot. For example, there may be 20 neighbor pilots in the neighbor set, and a 60-chip window for each neighbor pilot. Accordingly, 1200 correlations should be performed. One can appreciate the importance of terminating the correlation for a particular chip offset at the early detection correlation length to reduce the time that radiotelephone 100 must wake up before monitoring the paging channel to search for and acquire the pilot channel having the greatest strength.

The values for the full correlation length, the early detection correlation length, and the EDT are chosen to provide satisfactory searcher speed while achieving acceptable probability of missing a pilot signal and acceptable probability of falsing.

According to the invention, the EDT is dynamically adjustable depending upon the strength of the active pilot signal, which is an important aspect of the invention. The EDT can be re-set from a first value to a second value. "Dynamic" as referred to herein means the ability to make an adjustment to a pre-programmed parameter after the pilot acquisition method has commenced. When there is a sufficiently strong pilot signal, the importance of finding a stronger neighbor pilot signal is diminished, thus allowing a higher acceptable probability of missing weaker pilots while maintaining a high probability of detecting still stronger pilots. This means that the EDT can be raised, resulting in a faster sweep of each neighbor pilot and reducing the total time needed to sweep the entire neighbor set.

Figure 3:
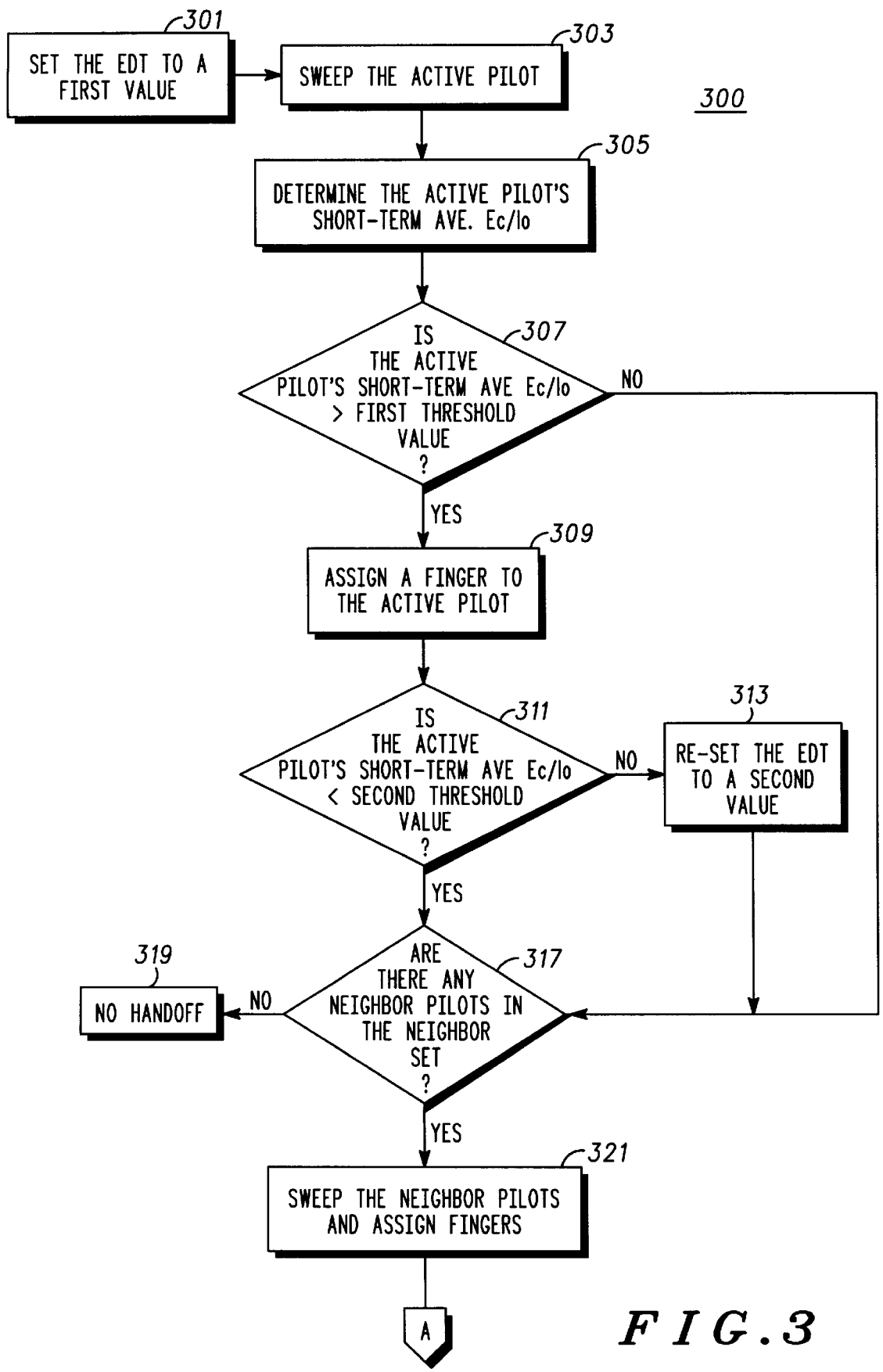
Figure 4:
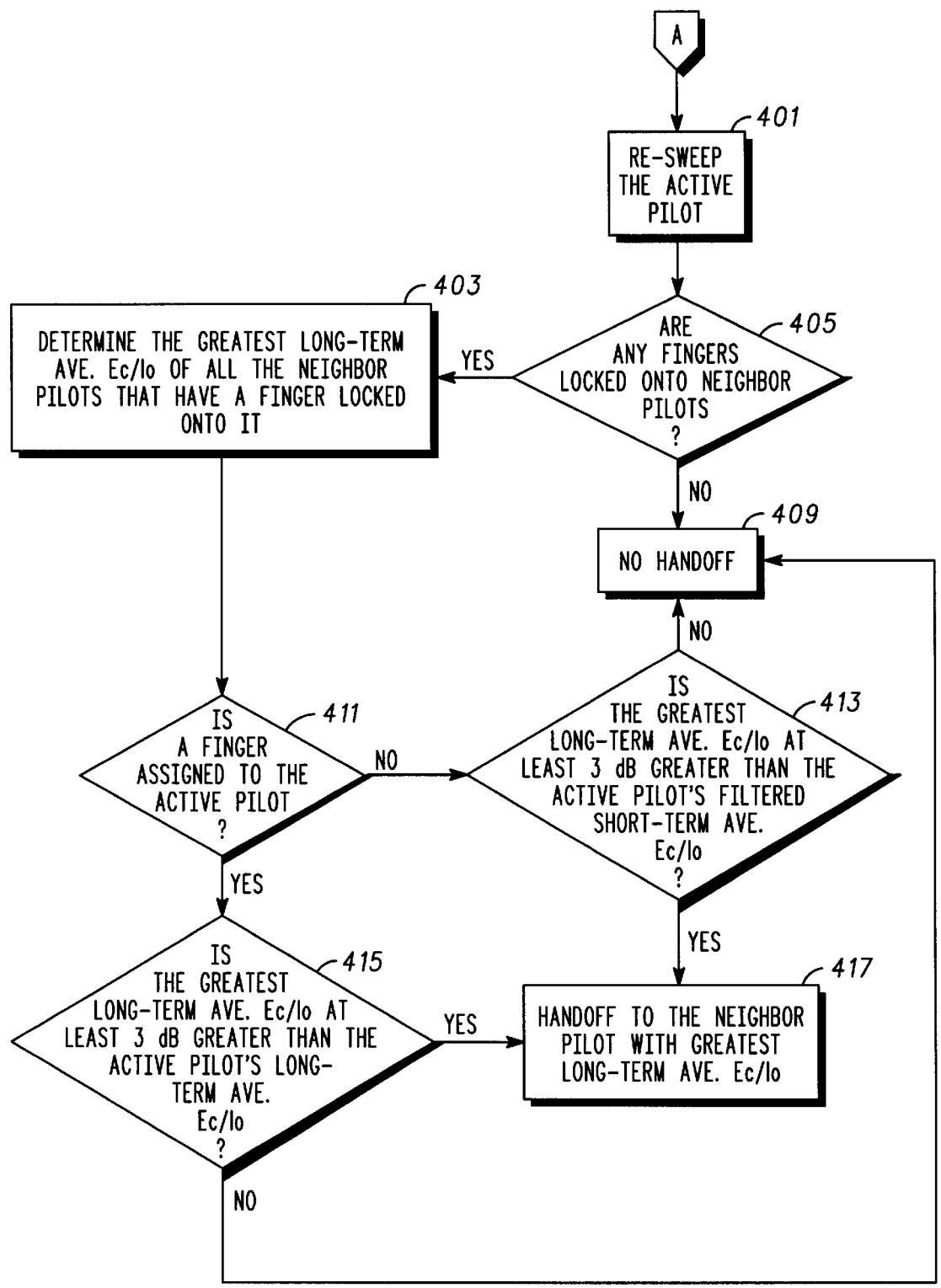
FIG. 4 is a flow chart illustrating a method of sweeping a pilot channel.

FIGS. 3 and 4 are flow charts illustrating a method 300 of pilot channel acquisition carried out by the wireless communication device. As previously described, in the preferred embodiment, the EDT is initially set at a first value. (Step 301.) Upon waking up, searcher receiver 109 sweeps the active pilot to find the strongest ray, (step 303) and determines the active pilot's short-term average $E_c/I_o$, (step 305), in a similar manner as described for sweeping a neighbor pilot. Logic and control circuit 113 then determines whether the active pilot channel's pilot strength is less than a first threshold value. (Step 307.) If not, logic and control circuit 113 then determines if there are any neighbor pilots in the neighbor set. (Step 317.) When the active pilot channel's pilot strength is less than the first threshold value, logic and control circuit 113 assigns a finger receiver to the active pilot channel. (Step 309.)

When a finger receiver is assigned to a pilot channel, it locks onto and tracks the pilot channel at the chip offset determined to have the greatest signal strength. While it is tracking, it is possible that the signal strength will diminish to an unacceptable level indicating that the pilot channel has been lost. When this happens, the finger receiver can be unlocked and made available for assignment to other pilot channels.

When locked onto a pilot channel, the finger receiver can provide a measure of the pilot strength. In the preferred embodiment, this pilot strength is a measure of $E_c/I_o$, but unlike the short-term average $E_c/I_o$ provided by the searcher receiver, this $E_c/I_o$ measurement has been filtered and represents a cumulative, filtered measure of $E_c/I_o$, referred to as long-term average $E_c/I_o$ herein. In simple terms, the short-term average $E_c/I_o$ can be considered a snapshot of the pilot strength, and the long-term average $E_c/I_o$ is a long-term look at the pilot strength. Because of such factors as Rayleigh fading which causes the energy of the pilot signal to change, the short-term average $E_c/I_o$ measurement is not as reliable as the long-term average $E_c/I_o$.

Logic and control circuit 113 further determines whether the active pilot channel's pilot strength is less than a second threshold value, which in the preferred embodiment is of a higher value than the first threshold value. (Step 311.) If so, logic and control circuit 113 determines if there are any neighbor pilots in the neighbor set. (Step 317.) When the active pilot channel's pilot strength is not less than the second threshold value, logic and control circuit 113 re-sets the EDT to a second value. (Step 313.)

When there are no neighbor pilots in the neighbor set, there will be no handoff. (Step 319.) When there are neighbor pilots in the neighbor set, the sweep of the neighbor pilots will commence, as described in reference to FIG. 2, and finger assignments will be made to the strongest neighbor pilots. (Step 321.)

Figure 5:
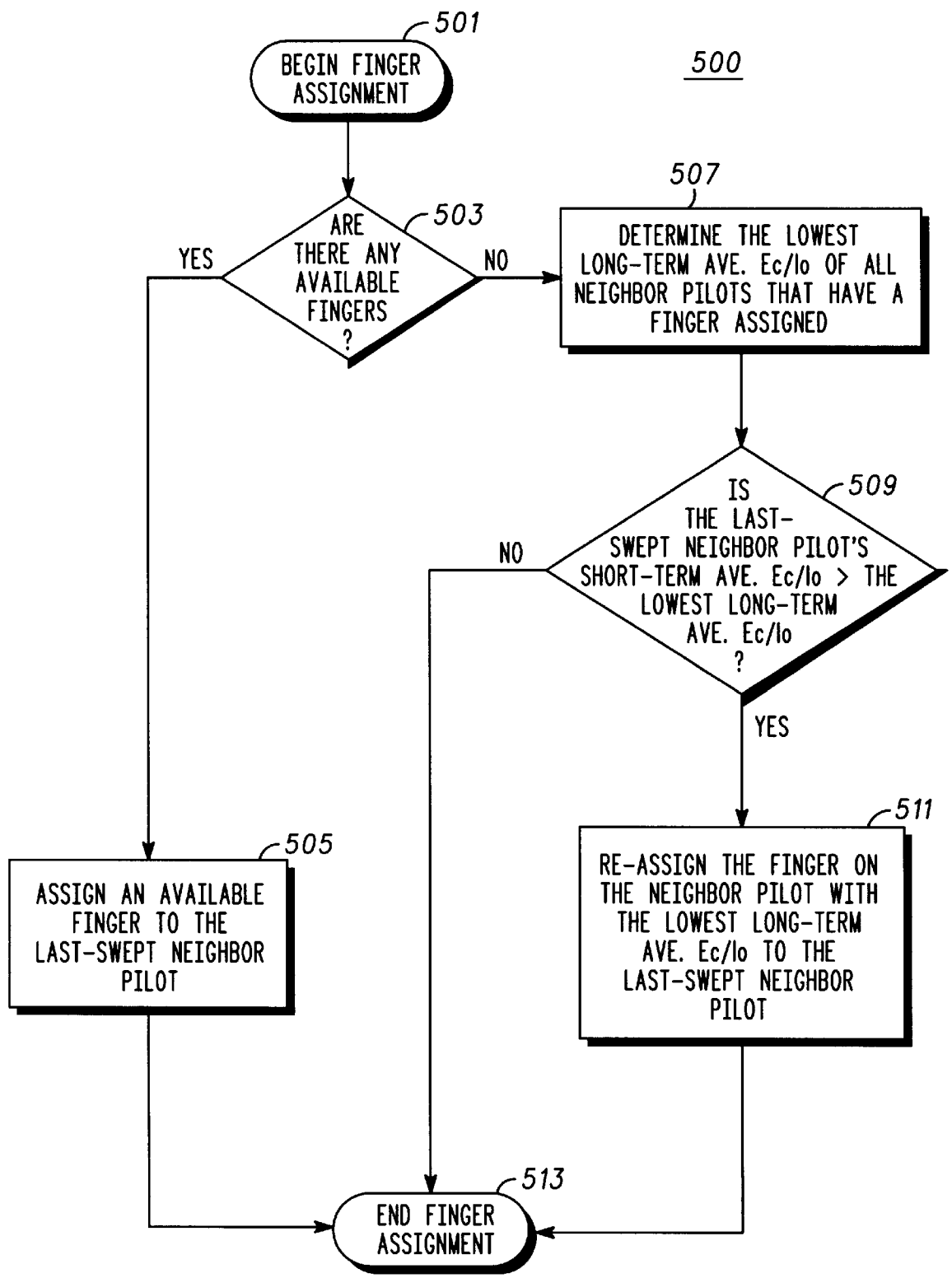
FIG. 5 is a flow chart illustrating a method of assigning a finger receiver to a pilot channel.

FIG. 5 is a flow chart illustrating a method 500 of assigning a finger -receiver to a neighbor pilot. After completion of the sweep of a neighbor pilot, (see FIG. 2, step 215), the finger assignment method is commenced, (step 501.) Logic and control circuit 113 determines whether there are available finger receivers. When there is an available finger receiver, the available finger receiver is assigned to the last-swept neighbor pilot channel. (Step 505.) The finger receivers may not be available when, after a few iterations of method 200 and method 500, all of the fingers have been assigned to active and neighbor pilots, and the fingers remain locked onto these pilots. When a finger receiver is not available, then a determination must be made as to whether a finger assigned and locked onto a neighbor pilot should be re-assigned to the last-swept neighbor pilot channel. To do so in the preferred embodiment, logic and control circuit 113 determines the lowest long-term average pilot strength of all neighbor pilots that have finger receivers assigned. (Step 507.) Then logic and control circuit 113 determines whether the pilot strength of the last-swept neighbor pilot channel is greater than lowest long-term average pilot strength. (Step 509.) If not, then the last-swept neighbor pilot channel is not assigned to a finger and the finger assignment method for the last-swept pilot ends. (Step 513.) If so, then logic and control circuit 113 re-assigns the finger receiver tracking the neighbor pilot with the lowest long-term average pilot strength to the last-swept neighbor pilot channel, (step 511), and the finger assignment method for the last-swept pilot ends. (Step 513.)

Reference will now be made to FIG. 4 in further describing the method of pilot channel acquisition. After all of the neighbor pilots have been swept (provided there was enough time) and finger assignments made, logic and control circuit 113 determines if any fingers are locked onto neighbor pilots, (step 405.) When no fingers are locked onto neighbor pilots, then no handoff is made. (Step 409.) If there are one or more fingers locked onto neighbor pilots, then a determination must be made as to whether a handoff should be made to one of these neighbor pilots. A handoff will be made when a neighbor pilot channel that has a finger receiver locked onto it when its pilot strength is sufficiently greater than the pilot strength of the active pilot channel.

In the preferred embodiment, searcher receiver 109 re-determines the active pilot's strength by re-sweeping the active pilot channel and re-determining its short-term average $E_c/I_o$. (Step 401). Logic and control circuit 113 then determines the greatest neighbor pilot strength of the neighbor pilot channels that have finger receivers assigned. In the preferred embodiment, it is the long-term average $E_c/I_o$ of the neighbor pilots provided by the finger receivers that are compared to determine which has the greatest value. (Step 403.)

Assigning neighbor pilots to fingers during pilot channel acquisition and determining the greatest neighbor pilot strength of the neighbor pilot channels according to their long-term average $E_c/I_o$ is an important aspect of the invention, because long-term average $E_c/I_o$ provides a reliable measure of the pilot strength. Alternatively, the neighbor pilots that have locked-on finger receivers could be re-swept by the searcher receiver to obtain short-term average $E_c/I_o$ for comparison, or a list ranking neighbor pilot strength by short-term average $E_c/I_o$ could be made and the neighbor pilot at the top of the list chosen as the one having the greatest neighbor pilot strength. Neither alternative is preferred, however, because the short-term average $E_c/I_o$ is not as a reliable measure of pilot strength and, in the case of the ranking, the short-term average $E_c/I_o$ of neighbor pilots, especially those swept early, could have changed significantly while the neighbor set was being swept.

After determining the greatest neighbor pilot strength, logic and control circuit 113 determines whether the greatest neighbor pilot strength is greater than the active pilot channel's pilot strength. The active pilot's signal strength that is compared to the greatest neighbor pilot strength may be either the short-term average $E_c/I_o$ obtained in step 401, the long-term average $E_c/I_o$ if a finger receiver was assigned to the active pilot in step 309 shown in FIG. 3, or a filtered short-term average $E_c/I_o$. The filtered short-term average $E_c/I_o$ is obtained by filtering multiple measurements of short-term average $E_c/I_o$ obtained from sweeps of the active pilot, such as the sweeps performed in steps 303 and 403. Consequently, the filtered short-term average $E_c/I_o$ is a more reliable measure of the active pilot's strength than the short-term average $E_c/I_o$. The filtering can be performed by logic and control circuit 113.

Because the long-term average $E_c/I_o$ is preferred over the filtered short-term average $E_c/I_o$, logic and control circuit 113 determines whether a finger receiver is assigned to the active pilot channel. (Step 411.) If so, the greatest neighbor pilot strength is compared to active pilot's long-term average $E_c/I_o$. (Step 415.) If not, the greatest neighbor pilot strength is compared to active pilot's filtered short-term average $E_c/I_o$. (Step 413.)

In the preferred embodiment, the greatest neighbor pilot strength must be at least 3 dB greater than the active pilot's strength. This margin ensures that handoffs will only be made to neighbor pilots that have a significantly stronger signal than the active pilot, and reduces the number of handoffs during pilot acquisition. Furthermore, it provides a preference for monitoring the active pilot even though a stronger neighbor pilot may exist. One of ordinary skill in the art can appreciate that the margin can be set to values other than 3 dB. When the greatest neighbor pilot strength is not at least 3 dB greater than the active pilot's strength, no handoff is made. (Step 409.) When the greatest neighbor pilot strength is at least 3 dB greater than the active pilot's strength, a handoff is made to the neighbor pilot channel with the greatest neighbor pilot strength. (Step 417.)

In summary, a method utilized by a wireless communication device configured in accordance with the present invention acquires a pilot signal in an efficient and reliable manner by dynamically adjusting the early detection threshold whenever the active pilot strength is sufficiently strong, and, moreover, employing the finger receivers to obtain reliable pilot signal strength measurements of the active and neighbor pilots.

Those skilled in the art will recognize that various modifications and variations can be made in the method and apparatus of the present invention and in construction of this apparatus without departing from the scope or spirit of this invention.

What is claimed is:

1. A method of acquiring a pilot channel in a Code-Division Multiple Access system, the method comprising the steps of:

setting an early detection threshold (EDT) parameter to a first value;

determining a pilot strength of an active pilot channel;

determining whether the active pilot channel's pilot strength is less than the first value;

re-setting the EDT parameter to a second value when the active pilot channel's pilot strength is not less than the first threshold value;

determining whether there is at least one neighbor pilot channel in a neighbor set; and sweeping the at least one neighbor pilot channel when there is at least one neighbor pilot channel, the step of sweeping the at least one neighbor pilot channel including the substeps of, performing a correlation at a particular chip offset of the at least one neighbor pilot channel, determining a pilot strength at an early detection correlation length at the particular chip offset, determining whether the pilot strength at the early detection correlation length is less than the EDT parameter, and terminating the correlation at the particular chip offset when the pilot strength at the early detection correlation length is less than the EDT parameter;

assigning a finger receiver to the at least one neighbor pilot channel;

re-determining the pilot strength of the active pilot channel;

re-determining the pilot strength of the at least one neighbor pilot channel that has a finger receiver assigned; and handing off to the at least one neighbor pilot channel that has a finger receiver assigned when the re-determined pilot strength of the at least one neighbor pilot channel that has a finger receiver assigned is greater than the re-determined pilot strength of the active pilot channel.

2. The method of claim 1 wherein the second value is greater than the first value.

3. The method of claim 1 wherein the step of determining a pilot strength of an active pilot channel includes the substep of determining the active pilot's short-term average $E_c/I_o$.

4. The method of claim 1 wherein the step of determining a pilot strength at an early detection correlation length at the particular chip offset includes the substep of determining the pilot's short-term average $E_c/I_o$ at the early detection correlation length at the particular chip offset.

5. The method of claim 1 wherein the step of assigning a finger receiver to the at least one neighbor pilot channel includes the substeps of:

determining if there are available finger receivers; and assigning an available finger receiver to the at least one neighbor pilot channel when there are available finger receivers.

6. The method of claim 5 wherein the step of assigning a finger receiver to the at least one neighbor pilot channel further includes the substeps of:

determining the lowest long-term average pilot strength of all neighbor pilots that have finger receivers assigned when there are not any available finger receivers;

determining whether the pilot strength of the at least one neighbor pilot channel is greater than lowest long-term average pilot strength; and re-assigning a finger receiver on the neighbor pilot with the lowest long-term average pilot strength to the at least one neighbor pilot channel when the pilot strength of the at least one neighbor pilot channel is greater than lowest long-term average pilot strength.

7. The method of claim 1 wherein the step of re-determining a pilot strength of an active pilot channel includes the substep of determining the active pilot's short-term average $E_c/I_o$.

8. The method of claim 1 wherein the step of re-determining a pilot strength of the at least one neighbor pilot channel that has a finger receiver assigned includes the substep of determining the at least one neighbor pilot's long-term average $E_c/I_o$.

9. The method of claim 1 further comprising the steps of:

determining whether the active pilot channel's pilot strength is greater than a second threshold value; and assigning a finger receiver to the active pilot channel when the active pilot channel's pilot strength is greater than the second threshold value.

10. The method of claim 9 further including the step of forcing the active pilot channel's pilot strength to the first threshold value when the active pilot channel's pilot strength is not greater than the second threshold value.

11. The method of claim 1 further comprising the step of forcing the active pilot channel's pilot strength to the first threshold value when the active pilot channel's pilot strength is less than the first threshold value.

12. A method of acquiring a pilot channel in a Code-Division Multiple Access system, the method comprising the steps of:

determining whether there is at least one neighbor pilot channel in a neighbor set;

sweeping the neighbor pilot channels in the neighbor set when there is at least one neighbor pilot channel including the substep of determining the pilot strength of the neighbor pilot channels;

assigning finger receivers to the neighbor pilot channels according to pilot strength;

determining a greatest neighbor pilot strength of the neighbor pilot channels that have finger receivers assigned;

determining a pilot strength of an active pilot channel;

determining if the greatest neighbor pilot strength is greater than the active pilot channel's pilot strength; and handing off to the neighbor pilot channel with the greatest neighbor pilot strength when the greatest neighbor pilot strength is greater than the active pilot channel's pilot strength.

13. The method of claim 12 further comprising the steps of:

assigning a finger receiver to the active pilot channel when the active pilot channel's pilot strength is greater than the threshold value; and determining whether a finger receiver is assigned to the active pilot channel;

wherein, the step of determining a pilot strength of an active pilot channel includes the substep of determining the active pilot's long-term average $E_c/I_o$ when a finger receiver is assigned to the active pilot channel, the step of determining the greatest neighbor pilot strength of the neighbor pilot channels that have finger receivers assigned includes the substep of determining the greatest long-term average $E_c/I_o$, and the step of handing off to the neighbor pilot channel with the greatest neighbor pilot strength when the greatest neighbor pilot strength is greater than the active pilot channel's pilot strength includes the substep of handing off to the neighbor pilot channel with the greatest long-term average $E_c/I_o$ when the greatest long-term average $E_c/I_o$ is greater than the long-term average $E_c/I_o$ of the active pilot channel.

14. The method of claim 12 further comprising the steps of:

assigning a finger receiver to the active pilot channel when the active pilot channel's pilot strength is greater than the threshold value; and determining whether a finger receiver is assigned to the active pilot channel;

wherein, the step of determining a pilot strength of an active pilot channel includes the substep of determining the active pilot's filtered short-term average $E_c/I_o$ when a finger receiver is not assigned to the active pilot channel, the step of determining the greatest neighbor pilot strength of the neighbor pilot channels that have finger receivers assigned includes the substep of determining the greatest long-term average $E_c/I_o$, and the step of handing off to the neighbor pilot channel with the greatest neighbor pilot strength when the greatest neighbor pilot strength is greater than the pilot strength of the active pilot channel includes the substep of handing off to the neighbor pilot channel with the greatest long-term average $E_c/I_o$ when the greatest long-term average $E_c/I_o$ is greater than the filtered short-term average $E_c/I_o$ of the active pilot channel.

15. The method of claim 12 further comprising the steps of:

determining whether the greatest neighbor pilot strength is greater than a threshold value; and not handing off when the greatest neighbor pilot strength is not greater than the threshold value.

16. A wireless communication device for acquiring a pilot channel in a Code-Division Multiple Access system, the wireless communication device comprising:

a searcher receiver for sweeping an active pilot channel and a plurality of neighbor pilot channels, and for determining the short-term average pilot strength of the active pilot channel and each of the neighbor pilot channels;

a plurality of finger receivers for determining the long-term average pilot strength of the active pilot channel and the neighbor pilot channels; and a logic and control circuit for assigning the plurality of finger receivers to the active pilot channel and to the neighbor pilot channels according to their short-term average pilot strength, for determining the greatest long-term average pilot strength of the neighbor pilot channels, for determining if the greatest long-term average pilot strength is greater than the active pilot channel's long-term average pilot strength, and for determining to hand off to the neighbor pilot channel with the greatest long-term average pilot strength when the greatest long-term average pilot strength is greater than the active pilot channel's long-term average pilot strength.

17. The wireless communication device of claim 16 wherein:

the logic and control circuit determines whether the active pilot channel's short-term average pilot strength is less than a threshold value, and raises an early detection threshold (EDT) parameter value when the active pilot channel's short-term average pilot strength is not less than the threshold value;

the searcher receiver in sweeping the plurality of neighbor pilot channels performs a correlation at each chip offset corresponding to each neighbor pilot channel, determines a pilot strength at an early detection correlation length at each chip offset, determines whether the pilot strength at the early detection correlation length is less than the EDT parameter value, and terminates the correlation when the pilot strength at the early detection correlation length is less than the EDT parameter value.

18. A wireless communication device for acquiring a pilot channel in a Code-Division Multiple Access system, the wireless communication device comprising:

a searcher receiver for sweeping an active pilot channel and a plurality of neighbor pilot channels, and for determining the short-term average pilot strength of the active pilot channel and each of the neighbor pilot channels;

a plurality of finger receivers for determining the long-term average pilot strength of the neighbor pilot channels; and a logic and control circuit for filtering the short-term average pilot strength of the active pilot channel and providing a filtered short-term average pilot strength, assigning the plurality of finger receivers to the neighbor pilot channels according to their short-term average pilot strength, for determining the greatest long-term average pilot strength of the neighbor pilot channels, for determining if the greatest long-term average pilot strength is greater than the active pilot channel's filtered short-term average pilot strength, and for determining to hand off to the neighbor pilot channel with the greatest long-term average pilot strength when the greatest long-term average pilot strength is greater than the active pilot channel's filtered short-term average pilot strength.

19. The wireless communication device of claim 18 wherein:

the logic and control circuit determines whether the active pilot channel's short-term average pilot strength is less than a threshold value, and raises an early detection threshold (EDT) parameter value when the active pilot channel's short-term average pilot strength is not less than the threshold value;

the searcher receiver in sweeping the plurality of neighbor pilot channels performs a correlation at each chip offset corresponding to each neighbor pilot channel, determines a pilot strength at an early detection correlation length at each chip offset, determines whether the pilot strength at the early detection correlation length is less than the EDT parameter value, and terminates the correlation when the pilot strength at the early detection correlation length is less than the EDT parameter value.

20. A wireless communication device for acquiring a pilot channel in a Code-Division Multiple Access system, the wireless communication device comprising:

a searcher receiver for sweeping an active pilot channel and a plurality of neighbor pilot channels, and for determining the short-term average pilot strength of the active pilot channel and each of the neighbor pilot channels;

a plurality of finger receivers for determining the long-term average pilot strength of the neighbor pilot channels; and a logic and control circuit assigning the plurality of finger receivers to the neighbor pilot channels according to their short-term average pilot strength, for determining the greatest long-term average pilot strength of the neighbor pilot channels, for determining if the greatest long-term average pilot strength is greater than the active pilot channel's short-term average pilot strength, and for determining to hand off to the neighbor pilot channel with the greatest long-term average pilot strength when the greatest long-term average pilot strength is greater than the active pilot channel's short-term average pilot strength.

21. The wireless communication device of claim 20 wherein:

the logic and control circuit determines whether the active pilot channel's short-term average pilot strength is less than a threshold value, and raises an early detection threshold (EDT parameter) value when the active pilot channel's short-term average pilot strength is not less than the threshold value;

the searcher receiver in sweeping the plurality of neighbor pilot channels performs a correlation at each chip offset corresponding to each neighbor pilot channel, determines a pilot strength at an early detection correlation length at each chip offset, determines whether the pilot strength at the early detection correlation length is less than the EDT parameter value, and terminates the correlation when the pilot strength at the early detection correlation length is less than the EDT parameter value.

* * * * *